United States Patent [19]

Bosserman

[11] Patent Number: 5,207,995
[45] Date of Patent: May 4, 1993

US005207995A

[54] RECOVERY OF CERIUM FROM FLUORIDE-CONTAINING ORES

[75] Inventor: Paula J. Bosserman, Riverside, Calif.

[73] Assignee: Union Oil Company of California, Los Angeles, Calif.

[21] Appl. No.: 584,729

[22] Filed: Sep. 19, 1990

[51] Int. Cl.$^5$ ............................................. C01F 17/00
[52] U.S. Cl. .................................. 423/21.5; 423/21.1; 423/293; 423/185; 75/739; 75/743
[58] Field of Search .................... 423/21.1, 21.5, 179, 423/293, 185, 464; 75/739, 743

[56] References Cited

U.S. PATENT DOCUMENTS

| | | | |
|---|---|---|---|
| 377,701 | 3/1888 | Von Welsbach | 423/21.1 |
| 2,564,241 | 8/1951 | Warf | 423/21.1 |
| 3,812,233 | 5/1974 | Duncan | 423/21.1 |
| 4,051,219 | 9/1977 | Hafner | 423/21.1 |
| 5,002,747 | 3/1991 | Le Loorer | 423/21.1 |

Primary Examiner—Theodore Morris
Assistant Examiner—Edward Squillante
Attorney, Agent, or Firm—Gregory F. Wirzbicki; William M. Dooley; Alan H. Thompson

[57] ABSTRACT

Recovery of cerium values from fluoride-containing ores such as bastnasite is enhanced. The ore is ground, roasted, and leached with dilute hydrochloric acid to produce an ore concentrate. The concentrate is treated with a solution of hydrochloric acid and boric acid to solubilize cerium values and convert fluoride to tetrafluoroborate ion. Tetrafluoroborate is removed from the solution, e.g., by precipitation, and the solution is further processed for recovery of cerium values. Removal of tetrafluoroborate avoids loss of cerium as insoluble cerium tetrafluorborate during said further processing.

17 Claims, No Drawings

RECOVERY OF CERIUM FROM FLUORIDE-CONTAINING ORES

FIELD OF THE INVENTION

This invention relates to recovery of cerium values from fluoride-containing rare earth ores such as bastnasite.

INTRODUCTION

The principal rare earth source mineral in the United States is bastnasite, a mixture of lanthanide fluorocarbonates. Processing of bastnasite comprises crushing, flotation, roasting, and leaching steps that accomplish progressive separation and concentration of the various rare earth values contained in the ore. It has proven especially difficult to recover purified cerium in high yield. Demand for cerium is presently increasing, and improvement in the yield of cerium from bastnasite processing is needed.

SUMMARY OF THE INVENTION

The present invention provides methods for increasing the yield of cerium values from fluoride-containing mixtures such as ores and ore concentrates.

First, the solubilization of cerium values from a solid mixture is improved by treating the mixture with a solution of hydrochloric acid and a boron compound such as boric acid. This solution is capable of dissolving substantially all the cerium values present, including the cerium fluorides which are insoluble in hydrochloric acid alone. At the same time, fluoride is dissolved and converted to tetrafluoroborate ion, $BF_4^-$, which catalyzes the solubilization of ceric oxide. The insoluble residue, now depleted of cerium values, is removed and the cerium-enriched solution is further treated as described below for removal of the tetrafluoroborate.

Next, tetrafluoroborate ion is removed from the cerium-enriched solution. In one embodiment of the invention, a source of soluble potassium ion is added to the cerium enriched solution to precipitate insoluble potassium tetrafluoroborate, which is removed. Removal of tetrafluoroborate at this point avoids the loss of cerium values as insoluble cerium tetrafluoroborate when the cerium-enriched solution is subjected to further processing for removal of non-cerium constituents. The resulting cerium-enriched, fluoride-depleted solution can then be subjected to cerium recovery steps similar to those employed with conventional cerium-containing solutions to provide improved yields of cerium.

DETAILED DESCRIPTION OF THE INVENTION

Bastnasite ore typically comprises from about 5 to 8 and typically about 6 weight percent rare earths calculated as rare earth oxides LnO (rare earth value of 6%). The balance comprises what are considered impurities such as the associated quartz, barite, calcite and strontianite. The ore is pulverized and ground to a size that will pass through a 100 mesh screen. Typically, the particle size is within the range of from about 1 to 100 microns and preferably within the range of from about 5-25 microns.

The ground ore is subjected to a flotation process to separate a substantial amount of impurities from the rare earth compounds. Typically, during the flotation process the bastnasite is separated from associated minerals such as quartz, barite, calcite and strontianite. This process produces a concentrate comprising about 60 weight percent rare earths calculated as oxides.

The concentrate is then subjected to a first acid leach with a dilute hydrochloric acid (pH about 1.0) to remove some of the alkaline earth constituents of the concentrate. This produces an enriched concentrate comprising approximately 70 weight percent rare earths calculated as oxides.

The enriched concentrate is then roasted, typically at about 400° C. to about 800° C., in the presence of air. The roasting step converts the fluorocarbonate mineral to a mixture of fluorides and oxides and oxidizes the cerium content to its tetravalent state. The roasting step also oxidizes some of the remaining alkaline earth constituents to their corresponding oxides. A typical roasted ore can comprise the oxides, carbonates, and/or fluorides of strontium, calcium, barium and magnesium, for example in concentrations, calculated as the oxides, of at least about 0.5, 7.0, 5.0 and 1.0 weight percent respectively.

The roasted ore is then subjected to a second acid leach, this time with a more concentrated acid solution. Typically, the second leach utilizes approximately a 0.1 to 0.5N and preferably about a 0.2N hydrochloric acid. The purpose of this leach is to remove the remaining alkaline earth constituents and to separate the cerium from the other rare earth oxides. A substantial proportion of the cerium is recovered as an insoluble residue ("cerium concentrate") while the solubilized rare earths are removed and sent to a separate solvent extraction facility for recovery.

The solid cerium concentrate from the second acid leach typically contains a mixture of cerium compounds including ceric oxide and cerium fluorides (e.g., cerous fluoride, ceric fluoride, and hydrous ceric fluoride), along with other constituents such as compounds of iron, thorium, alkaline earths, lead, and calcium.

In a conventional process, the solid cerium concentrate is next treated with a third acid leach, a still more concentrated hydrochloric acid solution (e.g., about 50 weight percent HCl), to solubilize the cerium values for further processing. Cerium values that are not solubilized at this point are usually lost. The ceric oxide dissolves, but the cerium fluorides are insoluble in the hydrochloric acid solution. Thus, in conventional processes, cerium values present as fluorides have usually been lost.

However, in accordance with the present invention, solubilization of cerium values from a solid, fluoride-containing mixture is improved by treating the mixture with a concentrated solution of a strong acid, i.e., an acid that is highly ionized in aqueous solution, to which a suitable boron compound, such as boric acid, has been added. A suitable boron compound is one which is capable of reacting with the fluoride in the mixture, including that present as cerium fluorides, to form a soluble complex of boron and fluorine, which complex in turn can be removed from the solution as tetrafluoroborate, e.g., by precipitation as a tetrafluoroborate salt. Strong acids that can be used in the practice of this invention include, for example, hydrochloric acid, nitric acid, sulfuric acid, and mixtures thereof; hydrochloric acid is highly preferred. The use of a boron compound in accordance with this invention has two significant advantages. First, the cerium fluorides are dissolved, so that the yield of cerium from the solid mixture is increased. Second, the tetrafluoroborate ion catalyzes the dissolution of ceric oxide, so that the cerium values are brought into solution faster and more efficiently. This decreases the time required for carrying out the acid leach step and increases the productivity of the process.

It has previously been recognized that ceric oxide is essentially insoluble in pure, concentrated hydrochloric acid, but that a small concentration of soluble fluoride ion in the hydrochloric acid very effectively catalyzes the dissolution of the ceric oxide. It has now been found in the practice of this invention that a reaction product of a boron compound, such as boric acid, and a fluoride, such as a fluoride component of a cerium ore concentrate, is an even more effective catalyst than fluoride alone for the dissolution of ceric oxide in hydrochloric acid solution. The catalytic species is believed to be a complex of boron and fluorine, specifically a fluoroborate, more specifically the tetrafluoroborate ion, $BF_4^-$. It is also believed that the tetrafluoroborate ion is in equilibrium in the acid solution with another fluoroborate species, $BF_3OH^-$, which can be formed by hydrolysis of tetrafluoroborate ion, and such species may also have catalytic activity in the dissolution of ceric oxide. Other species comprising boron and fluorine may also exist in solution, such as large complexes comprising tetrafluoroborate or species existing in equilibrium with tetrafluoroborate. As used herein, the term "fluoroborate" means tetrafluoroborate and any species in solution comprising boron and fluorine which comprises or is in equilibrium with tetrafluoroborate. For the purpose of solubilizing cerium oxides, the catalytic species can be present in proportions as small as about 0.01 mole per mole of cerium oxide, preferably at least about 0.05 mole per mole, more preferably at least about 0.1 mole per mole. Higher proportions can also be used.

For the purpose of solubilizing cerium fluorides, such as cerium fluorides present in admixture with cerium oxides in a cerium ore concentrate, sufficient boron compound is used to provide at least about 0.1 mole of boron per 4 moles of fluoride present in the cerium concentrate, and preferably at least about 0.5 mole of boron per 4 moles of fluorine. More preferably, sufficient boron compound is included to provide at least about 1 mole of boron for every 4 moles of fluorine present. In the embodiment most preferred at present, at least about 2 moles of boron are provided for every 4 moles of fluorine. Ratios of boron to fluorine as high as about 8 moles B per 4 moles F, preferably no more than about 4 moles B per 4 moles F, can be used beneficially. Even lower and higher ratios of boron to fluorine can be used; but higher ratios offer little added benefit, and lower ratios can dissolve less of the cerium fluorides in the cerium concentrate, resulting in a diminished yield of cerium. In accordance with the present invention, a substantial portion, e.g., at least about 10 weight percent, preferably at least about 25 percent, and more preferably at least about 50 percent, of all the cerium fluorides in the solid mixture is solubilized. The fluoride content thereof is converted to soluble species such as $BF_4^-$ and, it is believed, $BF_3OH^-$; and the cerium content is solubilized at the same time.

Any boron compound that reacts with fluoride in acid to form tetrafluoroborate ion can be used in the practice of this invention. Examples of suitable boron compounds include boric acid and borates soluble in the leach solution, preferably alkali metal borates such as potassium borate and sodium borate (borax). In the highly acidic solutions used in the process of this invention, borates added to the leach solution react to form boric acid in the solution. When the borates are used, additional mineral acid is needed to react with the borate. Thus, boric acid itself is presently the most preferred boron compound for use in the process of the invention.

In a leaching step in accordance with this invention, a solid mixture comprising cerium oxide and a fluoride is treated with a concentrated aqueous solution of hydrochloric acid in the presence of a boron compound such as boric acid. The fluoride is typically a fluoride salt of a metal, usually a lanthanide metal, or a mixture of such fluorides. Preferably, the fluoride comprises one or more cerium fluorides. The process of this invention is particularly beneficial in solubilizing mixtures of both ceric oxide and one or more cerium fluorides. Thus, mixtures which comprise substantial proportions of both ceric oxide and cerium fluoride are preferred for treatment in accordance with this invention; typically, the ratio of cerium atoms present as oxide to cerium atoms present as fluoride is no less than about 1 to 9 an no greater than about 9 to 1. Preferably, the ratio is between about 1 to 5 and about 5 to 1, and more preferably between about 1 to 2 and about 2 to 1. For example, in a cerium concentrate derived from roasted bastnasite, the ratio can be about 1 to 1; i.e., about half the cerium can be present in the form of oxide and about half in the form of fluorides.

The solid mixture typically is finely-divided, preferably having particle sizes no larger than about 10 microns. Larger particles take longer to dissolve. Typically, the finely divided solid is slurried in water with the boric acid. Sufficient concentrated hydrochloric acid to provide the desired concentration of HCl in the leach acid solution is then added slowly with mixing over a period of, for example, 2 to 3 hours. Initially, the leach acid solution typically comprises at least about 50 weight percent HCl, preferably at least about 60 percent, and more preferably at least about 70 percent; and typically no more than about 90 percent, preferably no more than about 85 percent, and more preferably no more than about 80 percent HCl. Leaching can be carried out at any temperature from ambient, e.g., about 20° C., up to the boiling point of the liquid/solid mixture, e.g., about 100° C. at ambient pressure. Higher temperatures can be used if the leaching is carried out at elevated pressure. However, moderate temperatures at ambient pressure are preferred, e.g., between about 40° and about 90° C., preferably between about 50° and about 80° C. Temperatures in the range of about 60° to about 70° C., e.g., about 65° C., are most preferred. Leaching is carried out typically for about 3 to about 12 hours, preferably from about 5 to about 9 hours, with stirring. At the conclusion of the leach step, sufficient hydrochloric acid should still be present in the leachate to prevent reprecipitation of cerium compounds; preferably, the leachate is at least about 4N in hydrochloric acid concentration.

Once the cerium values have been solubilized, any insoluble residue is removed, and the cerium-containing solution is processed for further purification and concentration of the cerium values.

The next step in processing the cerium-containing solution resulting from such a concentrated hydrochloric acid leach has generally involved adding a base to raise the pH of the solution sufficiently to precipitate certain impurities such as iron. However, it has been found that when tetrafluoroborate ion is present in the solution, cerium tetrafluoroborate can coprecipitate with the impurities when the pH is raised, and the cerium content of the precipitate can thus be lost.

Therefore, in accordance with another embodiment of this invention, a solution containing dissolved cerium ions and tetrafluoroborate ions is treated so as to remove tetrafluoroborate from the solution while leaving cerium in solution. Then, the pH of the solution can be raised to precipitate impurities without coprecipitating cerium values as cerium tetrafluoroborate. Preferably, the solution is treated with a substance that reacts with tetrafluoroborate ion to form an insoluble compound, which precipitates and is separated from the solution before the pH thereof is raised.

Compounds suitable for use in removing tetrafluoroborate from cerium-containing solutions in accordance with this invention include, without limitation, acid-soluble potassium compounds, preferably potassium salts of strong inorganic acids, such as the halides, nitrate, sulfate, and the like. Potassium chloride is preferred because it does not introduce a type of anion not already present in the solution. Potassium tetrafluoroborate has low solubility in the solution and therefore precipitates, removing tetrafluoroborate ion from the solution. Sufficient potassium is added to combine with and precipitate out of solution a substantial portion of the tetrafluoroborate ion present, e.g., at least about 25 percent, preferably at least about 40 percent, and more preferably at least about 60 percent of the tetrafluoroborate ion. Preferably, sufficient potassium compound is added to provide at least about 0.5 mole, more preferably at least about 1 mole, of potassium ion per mole of boron present in the solution.

The potassium compound can be added at any stage of the leach step: at the beginning, or gradually during the leach period, or at the end. Preferably, it is added at the beginning, so that as tetrafluoroborate ion is formed in the solution, it reacts with the potassium ion and precipitates when the solubility limit of potassium tetrafluoroborate is reached. In this way, the concentration of tetrafluoroborate ion in solution is maintained below the solubility limit of cerous tetrafluoroborate, so that precipitation of cerous tetrafluoroborate is avoided.

It is desirable to achieve as high a concentration of solubilized cerium in the leachate as possible to avoid the difficulty of recovering the metal values in solid form from dilute solution. Higher concentrations facilitate further processing and eventual recovery of a solid cerium compound. In a hydrochloric acid leachate containing a substantial concentration of tetrafluoroborate ion, such as that resulting from the leaching of a cerium concentrate derived from bastnasite, the concentration of cerium ion must be kept relatively low, no higher than about 60 grams per liter, as cerium, to avoid the loss of cerium through unwanted precipitation of cerium tetrafluoroborate.

It has been found, in accordance with an embodiment of this invention, that the addition of potassium to the leach solution during the leaching step, preferably at the beginning, maintains the concentration of tetrafluoroborate ion in the solution sufficiently below the solubility limit of cerium tetrafluoroborate that a higher concentration of solubilized cerium can be achieved in the leachate without loss of cerium as cerium tetrafluoroborate. Thus, the cerium concentration in the leachate can be at least about 90 grams per liter, preferably at least about 120 g/l, and more preferably at least about 150 g/l, as cerium.

The potassium tetrafluoroborate is removed, e.g., by filtration, leaving a solution which is enriched in cerium and depleted in fluoride. Once such a solution has been prepared in accordance with this invention, it can be further processed to recover cerium values in a desired form with little or no loss of cerium as cerium tetrafluoroborate.

For example, the solution can be treated for recovery of solid cerium carbonate in a manner similar to that used for treatment of cerium containing solutions obtained by conventional hydrochloric acid leaching of bastnasite. In one such process, the pH of the solution is raised sufficiently to precipitate iron compounds, e.g., to about 2.6, with a base such as aqueous sodium hydroxide solution. The solution is filtered, a soluble sulfide such as sodium hydrogen sulfide is added to precipitate lead as lead sulfide, and the solution is again filtered. The solution is reacidified, e.g., to about pH 1.0, and a soluble carbonate, preferably an alkali metal carbonate such as sodium carbonate solution, is slowly added. As the soluble carbonate is added, cerium carbonate precipitates and is removed, for example by filtration on a continuous belt filter. Carbonate addition is halted before undesirable compounds begin to precipitate in appreciable amounts, e.g., before the pH of the solution exceeds about 4.9. The cerium carbonate is recovered from the filter and dried. Cerium carbonate of high purity, e.g., at least about 90 percent pure, preferably at least about 95 percent pure, can be made in this way.

In another embodiment of the invention, a material containing at least one cerium component of bastnasite and at least one fluoride component of bastnasite can be contacted with a leach solution comprising concentrated hydrochloric acid, a suitable boron compound, and, preferably, a source of potassium ion. Suitable materials include roasted and unroasted (raw) bastnasite, and residues thereof from prior processing operations that contain cerium and fluoride components. The cerium component can be, for example, a cerium oxide (from roasted bastnasite) or cerium carbonate (from raw bastnasite). The fluoride component preferably comprises at least one cerium fluoride component. A leachate is formed which comprises solubilized cerium, a fluoroborate species, e.g., tetrafluoroborate, alkaline earth metals, and other lanthanides, as well as impurities such as iron and lead. In accordance with this invention, both cerium carbonates and cerium fluorides a solubilized, providing enhanced solubilization of cerium values from the bastnasite material. The leachate can then be processed for isolation and recovery of the cerium values. For example, iron can be precipitated by raising the pH of the leachate, and then lead can be removed by precipitation as lead sulfide. Carbonate is then added to the filtered solution to precipitate lanthanide carbonates, leaving alkaline earth metal carbonates in solution. The lanthanide carbonates are then roasted in the presence of oxygen to form lanthanide oxides, which are then contacted with a dilute hydrochloric acid leach to dissolve the non-cerium oxides, leaving the desired ceric oxide. The ceric oxide can be recovered by filtration.

The following examples are intended to illustrate particular embodiments of the invention. The examples are not intended in any way to limit the invention, the scope of which is defined in the appended claims.

EXAMPLE 1

In these experiments, about 80 grams of Cerium Concentrate was slurried in 55 ml of water. About 5 grams of boric acid was added, the temperature was adjusted to 65° C., and about 85 ml of 37% hydrochloric acid was added dropwise with stirring over two hours. A control reaction without boric acid was prepared, and about 18 ml of 35% hydrogen peroxide was added to the control over the same two hour period as a reducing agent for the cerium. Each mixture was stirred for an additional hour and then filtered. The volume of each leachate was adjusted to 250 ml with 85/55 volume percent concentrated hydrochloric acid/water. About 2 grams of potassium chloride in 8 ml of water was added to 80 ml of the boric acid leachate and precipitated potassium tetrafluoroborate was removed by filtration. Aliquots of the control leachate, the boric acid leachate to which no potassium chloride was added, and the boric acid leachate treated with potassium chloride were adjusted to pH 2.6 with 50 weight percent sodium hydroxide solution, and the cerium content of each solution was measured. The results are presented in Table 1.

TABLE 1

| Solution | Cerium Yield (%) |
|---|---|
| Control | |
| Before pH adjustment | 57 |
| After pH adjustment | 55 |
| Boric Acid Leach (no KCl) | |
| Before pH adjustment | 64 |
| After pH adjustment | 55 |
| Boric Acid Leach (after KCl treatment) | |
| Before pH adjustment | 63 |
| After pH adjustment | 61 |

These experiments illustrate a relative improvement in the solubilization of cerium with the use of boric acid. The results for Boric Acid Leach (no KCl) show the improved solubilization of cerium and the loss of cerium that can follow pH adjustment of boric acid leachate if tetrafluoroborate ion is not removed from the solution before the pH is raised. The results for Boric Acid Leach (after KCl treatment) show both the improved solubilization of cerium and the excellent retention of cerium values in solution after pH adjustment when the solution has been treated for removal of tetrafluoroborate ion.

EXAMPLE 2

A slurry of 24.5 grams of Cerium Concentrate and 4.6 grams of boric acid in 99 ml water was heated to 70° C. and then 105 ml of concentrated hydrochloric acid was added over two hours. The mixture was allowed to react for an additional 2.5 hours at 70° C., and remaining solids were removed by filtration. Then 5.6 grams of potassium chloride dissolved in water was added, the resulting potassium tetrafluoroborate precipitate was removed by filtration, and the pH of the filtrate was adjusted to 2.6 with sodium hydroxide to remove iron.

The leach solution was found to contain about 91% of all the cerium present in the Cerium Concentrate feed. The feed contains a small amount of monazite (cerium phosphate), which is insoluble in hydrochloric acid solutions, and so the maximum theoretical yield of cerium from such feed in a hydrochloric acid based leachate system is about 94 to 97%. Thus, the 91% yield of solubilized cerium achieved by practice of this invention closely approaches the theoretical yield.

Further processing of the solution to produce cerium carbonate gave an overall cerium yield of about 82% based on the total cerium content of the solid feed. By contrast, solubilizing Cerium Concentrate as described, but without the use of boric acid and potassium chloride in accordance with this invention, has typically produced an overall yield of about 35 to 50%, occasionally as high as 65%. Thus, the overall yield of cerium carbonate from a process practiced in accordance with this invention is substantially increased.

EXAMPLE 3

A slurry of 58 grams of Cerium Concentrate, 10.95 grams of boric acid, and 13.2 grams of potassium chloride in 45 ml of water was heated to 65° C. and 155 ml of concentrated hydrochloric acid was added over two hours with stirring. The reaction mixture was allowed to react for an additional 7 hours at 65° C. The solids, containing unreacted residue from the Cerium Concentrate and precipitated potassium tetrafluoroborate, were removed by filtration. The pH of the filtrate was adjusted to 2.6 with sodium hydroxide to remove iron. The yield of solubilized cerium before pH adjustment was 92%, and the yield after pH adjustment was 85%. This example represents the presently most preferred embodiment of the invention.

While particular embodiments of the invention have been described and illustrated herein, it will be understood that the invention is not limited thereto, since many obvious modifications can be made. This invention is intended to include any such modifications as will fall within the scope of the appended claims.

What is claimed is:

1. A process for recovering cerium values from bastnasite which comprises the steps of:
   contacting a solid material comprising a cerium component and a fluoride component obtained from bastnasite with a solution of a strong acid and a boron compound capable of reacting with said fluoride component, the solution being sufficient to form a leachate containing solubilized cerium and a reaction product of said boron compound and said fluoride component; and
   contacting said leachate with a source of potassium ion to form a precipitate containing fluoroborate.

2. The process of claim 1 wherein said solution comprises hydrochloric acid.

3. The process of claim 1 wherein said solution comprises sulfuric acid.

4. The process of claim 1 wherein said solution comprises nitric acid.

5. The process of claim 2 wherein the solid material comprises a cerium oxide and a cerium fluoride.

6. The process of claim 2 wherein sufficient boron compound is used to provide at least about 1 mole of boron per 4 moles of fluoride.

7. A process for recovering cerium from bastnasite which comprises:
   roasting finely-divided bastnasite in the presence of oxygen;
   contacting roasted bastnasite with dilute hydrochloric acid solution sufficient to dissolve alkaline earth constituents, leaving a solid residue comprising cerium and fluoride components;
   leaching said solid residue with a more concentrated hydrochloric acid solution than said dilute hydrochloric acid solution, said concentrated acid solution containing a boron compound selected from the group consisting of boric acid and salts thereof, to form a leachate containing solubilized cerium and a fluoroborate species; and adding a source of potassium ion to the leachate to precipitate potassium tetrafluoroborate.

8. The process of claim 7 which comprises removing potassium tetrafluoroborate form the leachate.

9. The process of claim 7 wherein the hydrochloric acid solution also contains potassium ion sufficient to precipitate potassium tetrafluoroborate from the leachate during the leaching step.

10. The process of claim 9 wherein the solution comprises dissolved cerium constituting at least about 70 percent of the cerium initially present in the solid residue.

11. The process of claim 9 wherein the solution comprises dissolved cerium constituting at least about 80 percent of the cerium initially present in the solid residue.

12. The process of claim 9 wherein the solution comprises dissolved cerium constituting at least about 90 percent of the cerium initially present in the solid residue.

13. The process of claim 7, wherein the leaching is carried out at a temperature between about 40° and about 90° C.

14. The process of claim 7 wherein the leaching is carried out at a temperature between about 50° and about 80° C.

15. The process of claim 7 wherein the leaching is carried out at a temperature between about 60° and about 70° C.

16. The process of claim 7 wherein sufficient boron compound is present to provide at least about 1 mole of boron for each 4 moles of fluorine in the solid residue.

17. The process of claim 7 wherein sufficient boron compound is present to provide at least about 2 moles of boron for each 4 moles of fluorine in the solid residue.

* * * * *